United States Patent
Fincun et al.

(10) Patent No.: US 11,243,991 B2
(45) Date of Patent: Feb. 8, 2022

(54) CONTEXTUAL HELP RECOMMENDATIONS FOR CONVERSATIONAL INTERFACES BASED ON INTERACTION PATTERNS

(71) Applicant: International Business Machines Corporation, Armonk, NY (US)

(72) Inventors: Catherine Leavenworth Fincun, Austin, TX (US); Ashley Golen Johnston, Pittsburgh, PA (US); Collin James Murray, Lynnfield, MA (US); Adam Benvie, Dighton, MA (US); Nina Shahriaree, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/894,088

(22) Filed: Jun. 5, 2020

(65) Prior Publication Data
US 2021/0382925 A1 Dec. 9, 2021

(51) Int. Cl.
*G06F 16/33* (2019.01)
*H04L 12/58* (2006.01)
*G06F 40/20* (2020.01)
G06F 3/0484 (2013.01)
G06F 3/0481 (2013.01)

(52) U.S. Cl.
CPC .......... *G06F 16/3344* (2019.01); *G06F 40/20* (2020.01); *H04L 51/02* (2013.01); *G06F 3/0481* (2013.01); *G06F 3/04842* (2013.01)

(58) Field of Classification Search
CPC .... G06F 16/3344; G06F 40/20; G06F 3/0481; G06F 3/04842; H04L 51/02
See application file for complete search history.

(56) References Cited

U.S. PATENT DOCUMENTS

| 9,626,959 B2 | 4/2017 | Di Cristo et al. |
| 10,540,661 B2 | 1/2020 | Lange et al. |

(Continued)

FOREIGN PATENT DOCUMENTS

| CN | 107209549 B | 4/2020 |
| WO | WO2020/077082 A1 | 4/2020 |

OTHER PUBLICATIONS

"Google Assistant: Rich Responses", https://developers.google.com/assistant/conversational/df-asdk/rich-responses#suggestion_chips'; Downloaded from the internet on Jan. 7, 2021, 20 pages.

(Continued)

*Primary Examiner* — Seth A Silverman
(74) *Attorney, Agent, or Firm* — Stephen R. Tkacs; Stephen J. Walder, Jr.; Alexander G. Jochym (57) ABSTRACT

A mechanism is provided to implement a chatbot application for providing contextual help recommendations based on conversational context and interaction patterns. The chatbot application receives a query from a user and applies natural language processing (NLP) to the query to determine an objective of the query and a confidence of the objective. Responsive to determining the confidence of the objective is below a predetermined threshold, the chatbot application automatically generates a first set of recommendations to the user based on the conversation context and activates a contextual help recommendation button to indicate to the user that the first set of recommendations are available to be viewed.

20 Claims, 6 Drawing Sheets

(56) References Cited

U.S. PATENT DOCUMENTS

| | | | | |
|---|---|---|---|---|
| 2013/0145318 | A1* | 6/2013 | Hosotsubo | G06F 3/0482 715/811 |
| 2015/0113435 | A1* | 4/2015 | Phillips | H04L 51/02 715/752 |
| 2017/0161631 | A1* | 6/2017 | Rogers | G06F 3/0484 |
| 2017/0220670 | A1* | 8/2017 | Caldwell | G06F 16/287 |
| 2017/0344550 | A1* | 11/2017 | Fischer | G06F 16/24578 |
| 2019/0079920 | A1 | 3/2019 | Terry et al. | |
| 2020/0143265 | A1 | 5/2020 | Jonnalagadda et al. | |

OTHER PUBLICATIONS

"Intercom.com", https://www.intercom.com/; downloaded from the internet on Jan. 7, 2021, 5 pages.

"Lark Health: Digital Care Management & Prevention Platform", https://www.lark.com/; Downloaded from the internet on Jan. 7, 2021, 9 pages.

Anonymously, "Adapting conversation based on perceived user expertise", IP.com No. IPCOM000258019D, IP.com Electronic Publication Date: Apr. 1, 2019, 5 pages.

Anonymously, "Method and System for Curating Questions from Contextual Databases to Clarify User Intended Question in a Conversational Chatbot", IP.com No. IPCOM000256555D, IP.com Electronic Publication Date: Dec. 7, 2018, 3 pages.

Anonymously, "System to Provide Users with Impromptu Conversation Summaries and Make Conversational Recommendations, with an Emphasis onPersonal Customization, Based on Previous Conversations", IP.com No. IPCOM000246660D, IP.com Electronic Publication Date: Jun. 24, 2016, 6 pages.

Chaves, Ana P. et al., "How should my chatbot interact? A survey on human-chatbot interaction design", arXiv:1904.02743v1 [cs.HC] Apr. 4, 2019, 44 pages.

Klopfenstein, Lorenz C. et al., "The Rise of Bots: A Survey of Conversational Interfaces, Patterns, and Paradigms", DIS '17: Proceedings of the 2017 Conference on Designing Interactive Systems, Jun. 2017, 11 Pages.

Skjuve, Marita et al., "Measuring user experience in chatbots: An approach to interpersonal communication competence", CONVERSATIONS 2018—an international workshop on chatbot research, Oct. 26, 2018 in conjunction with the 5th International Conference on Internet Science, St. Petersburg, Russia, 11 pages.

* cited by examiner

CONTEXTUAL HELP RECOMMENDATIONS FOR CONVERSATIONAL INTERFACES BASED ON INTERACTION PATTERNS

BACKGROUND

The present application relates generally to an improved data processing apparatus and method and more specifically to mechanisms for contextual help recommendations for conversational interfaces based on interaction patterns.

The IBM Watson® Assistant is a conversation service that provides a problem-solving experience to users. IBM Watson and all IBM Watson-based trademarks and logos are trademarks or registered trademarks of International Business Machines Corporation and/or its affiliates in the United States, other countries, or both. Conversation services respond to customers in a way that simulates a conversation between humans. Users interact with the application through one or more interfaces. Common choices might be messaging services, a chat window within a Web site, or even audio interfaces when combined with a speech-to-text service. The application sends the user input to the conversation service.

The application connects to a workspace or skill. In IBM Watson® Assistant, a workspace is an instance and a skill that is the main area that connects to an allocated chatbot. The natural language processing for a conversation service, such as IBM Watson® Assistant, happens inside a skill, which is a container for all the artifacts that define the conversation flow for an application. Each skill is trained to recognize certain concepts and to direct the conversation flow that governs user interaction. The conversation service interprets user input, directs the flow of the conversation, and gathers information that it needs. Based on identified intents and entities, the conversation service directs the conversation flow to provide the user with information or to gather additional information from the user.

The application can also interact with existing back-end systems based on the user's intent and additional information. For example, the application may search for information in public or private databases, open tickets, show diagrams and maps, or write the user input into systems of record.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising a processor and a memory, the memory comprising instructions that are executed by the processor to specifically configure the processor to implement a chatbot application for providing contextual help recommendations based on conversational context and interaction patterns. The method comprises receiving, by the chatbot application, a query from a user and applying natural language processing (NLP) to the query to determine an objective of the query and a confidence of the objective. The method further comprises automatically generating a first set of recommendations to the user based on the conversation context responsive to determining the confidence of the objective is below a predetermined threshold. The method further comprises activating a contextual help recommendation button to indicate to the user that the first set of recommendations are available to be viewed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Chatbots are rapidly gaining popularity as a mechanism to provide a more natural and intuitive way to interact with real world systems. Businesses and applications in a variety of different domains are using conversational systems as part of their user interfaces to provide a better quality of service and a richer experience to explore available information, make informed decisions and materialize business transactions. Chatbots can be broadly classified into two categories. One category includes systems that are pre-built and available as part of other products, such as operating systems, mobile phones and other electronic devices. These are more or less general-purpose conversational systems and are not targeted for a particular domain. The other category includes custom or domain-specific conversational systems that are targeted for particular applications, such as finance, travel, healthcare, etc. Usually there is an end goal for such chatbot applications. For example, a travel agent chatbot would endeavor to book a travel itinerary for the customer through conversational interactions. This type of chatbot can be custom built using existing services such as the IBM Watson® Assistant.

During conversations with chatbots, users often get frustrated because the answers provided by the chatbot application are incompatible with their needs. While some chatbots provide menus, carousels, and other ways to gain access to the system's capabilities, these elements are often hidden, difficult to understand, or disconnected from the context of the conversation. The experience ends up feeling like a waste of time, and the user quickly abandons the conversation and reverts to a Web search or digging through the navigation.

The illustrative embodiments provide a solution to this problem by providing in-context supported recommendations. These recommendations provide contextual information based on the conversation topic/state. Information designed to aid end users conversing with a chatbot application appears based on the conversation versus a fixed set of choices to aid the end user, some of which may not be relevant to the current conversation. Additionally, there may be more than one viable option for end users to choose, as conversation options can depend on chatbot confidence and end user needs/perspective to account for "missed" chatbot recognition of frustrating/wrong answers. Typically, the display of contextual information would be based on chatbot confidence.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" regarding particular features and elements of the illustrative embodiments. It should be appreciated that these terms and phrases are intended to state that there is at least one feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
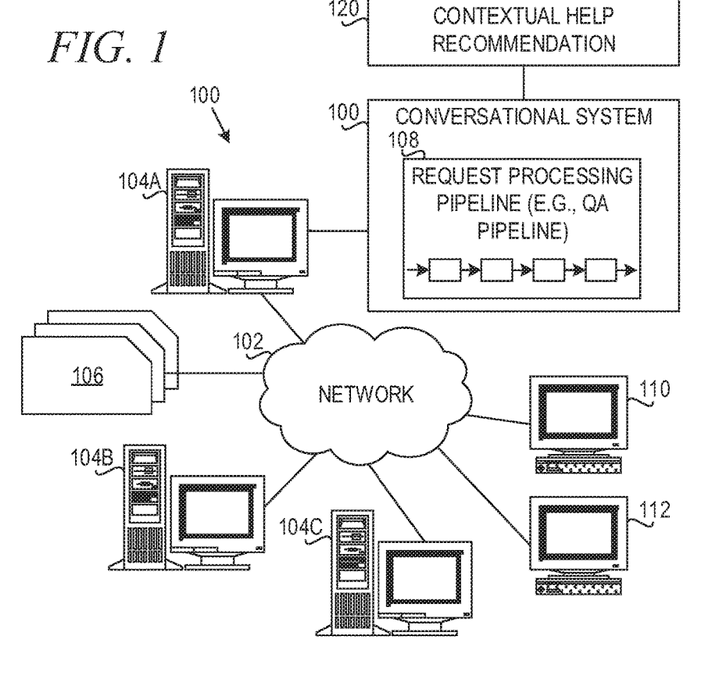
FIG. 1 depicts a schematic diagram of one illustrative embodiment of a conversational system in a computer network.
Figure 2:
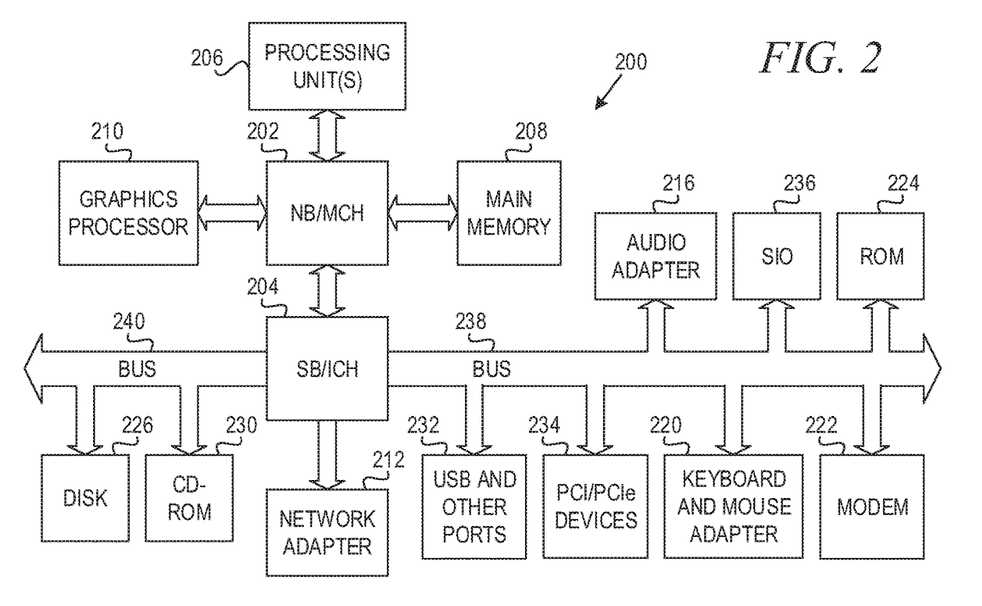
FIG. 2 is a block diagram of an example data processing system in which aspects of the illustrative embodiments are implemented.

As noted above, the present invention provides mechanisms for natural language processing, machine learning, ontology-based artifact generation for the conversation system. The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 is directed to describing an example cognitive system for conversational applications which implements a request processing pipeline, request processing methodology, and request processing computer program product with which the mechanisms of the illustrative embodiments are implemented. These requests may be provided as structured or unstructured request messages, or any other suitable format for requesting an operation to be performed by the conversational system.

It should be appreciated that the conversational system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, the request processing pipelines may be configured to provide different types of cognitive functions or support different types of business applications.

As will be discussed in greater detail hereafter, the illustrative embodiments may be integrated in, augment, and extend the functionality of these mechanisms of a conversational system regarding natural language processing and machine learning based ontology artifact generation. Thus, it is important to first understand how cognitive systems are implemented before describing how the mechanisms of the illustrative embodiments are integrated in and augment such cognitive systems and request processing pipeline mechanisms. It should be appreciated that the mechanisms described in FIG. 1 are only examples and are not intended to state or imply any limitation regarding the type of cognitive system mechanisms with which the illustrative embodiments are implemented. Many modifications to the example cognitive system shown in FIG. 1 may be implemented in various embodiments of the present invention without departing from the spirit and scope of the present invention.

FIG. 1 depicts a schematic diagram of one illustrative embodiment of a cognitive conversational system 100 implementing a request processing pipeline 108 in a computer network 102. The conversational system 100 implements a chatbot application on one or more computing devices 104A-C (comprising one or more processors and one or more memories, and potentially any other computing device elements generally known in the art including buses, storage devices, communication interfaces, and the like) connected to the computer network 102. For purposes of illustration only, FIG. 1 depicts the conversational system 100 being implemented on computing device 104A only, but as noted above the cognitive system 100 may be distributed across multiple computing devices, such as a plurality of computing devices 104A-C. The network 102 includes multiple computing devices 104A-C, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 may provide cognitive operations including, but not limited to, request processing and cognitive response generation which may take many different forms depending upon the desired implementation, e.g., cognitive information retrieval, training/instruction of users, cognitive evaluation of data, or the like. Other embodiments of the conversational system 100 may be used with components, systems, subsystems, and/or devices other than those that are depicted herein.

The conversational system 100 is configured to implement a request processing pipeline 108 that receive inputs from various sources. The requests may be posed in the form of a natural language question, natural language request for information, natural language request for the performance of a cognitive operation, or the like, and the answer may be returned in a natural language format. For example, the conversational system 100 receives input from the network 102, a corpus or corpora of electronic documents 106, cognitive system users, and/or other data and other possible sources of input. In one embodiment, some or all of the inputs to the conversational system 100 are routed through the network 102. The various computing devices 104A-C on the network 102 include access points for content creators and cognitive system users. Some of the computing devices 104A-C include devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the conversational system 100 may operate in environments of any size, including local and global, e.g., the Internet.

The conversational system 100 implements the pipeline 108, which comprises a plurality of stages for processing an input request based on information obtained from the corpus or corpora of data 106. The pipeline 108 generates responses for the input request based on the processing of the input request and the corpus or corpora of data 106.

As shown in FIG. 1, the conversational system 100 is further augmented, in accordance with the mechanisms of the illustrative embodiments, to include logic implemented in specialized hardware, software executed on hardware, or any combination of specialized hardware and software executed on hardware, for contextual help recommendation engine 120 for providing proactive and contextually relevant tools to aid the user in completing tasks and accomplishing the goals of the conversation.

In accordance with one aspect of the illustrative embodiments, contextual help recommendation engine 120 detects scenarios in which the user is frustrated or needs additional assistance and surfaces the relevant help tools directly to the user. In one embodiment, contextual help recommendation engine 120 provides contextual help recommendations in the content zone of a chatbot window. Surfacing the help tools automatically and proactively ensures that the user can locate the right tools at the right time.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements a cognitive system 100 augmented to include the additional mechanisms of the illustrative embodiments described hereafter.

In the depicted example, data processing system 200 employs a hub architecture including North Bridge and Memory Controller Hub (NB/MCH) 202 and South Bridge and Input/Output (I/O) Controller Hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX™ operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
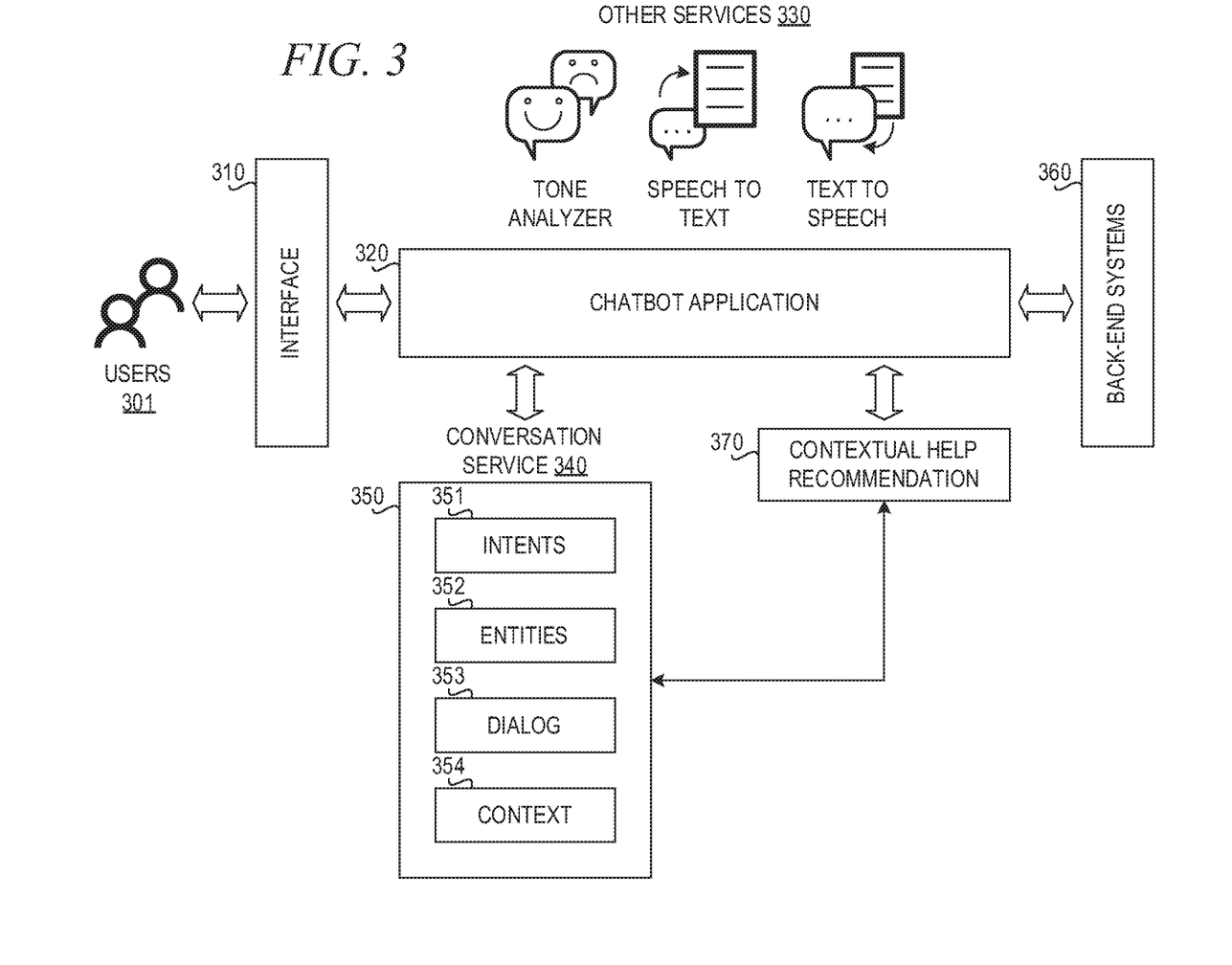
FIG. 3 is a block diagram of a conversational system in accordance with an illustrative embodiment.

FIG. 3 is a block diagram of a conversational system in accordance with an illustrative embodiment. Users 301 interact with chatbot application 320 through interface 310, which may be a messaging service, chat window within a Web site, an audio interface, or the like. Chatbot application 320 optionally processes the user input using other services 330, which include a tone analyzer, speech-to-text conversion, and text-to-speech conversion.

Chatbot application 320 sends the user input to the conversation service 340. The chatbot application 320 connects to skill 350. The natural language processing for the conversation service happens inside skill 350, which is a container for all the artifacts that define the conversation flow for application 320. Each skill 350 is trained to recognize certain concepts and to direct the conversation flow that governs the interaction. The conversation service interprets the user input, directs the flow of the conversation, and gathers information that it needs. In one embodiment, the conversation service uses machine learning to identify the concepts it was trained for. Based on concepts it identifies, the conversation service directs the conversation flow to provide the user with information or to gather additional information from users 301.

Skill 350 includes intents 351, entities 352, dialog 353, and context 354 for a given interaction with a user. Intents 351 represent the purpose or goal expressed in the user input/query. Intents represent the objective or goal expressed in the user input/query. Conversational services typically use a Deep Learning network to identify intents from a given user query within the context of a conversation. As a consequence, most systems require upfront specification of all intents with labeled query examples for training a neural network. These intents are usually based on the purpose of the business application and the scope of questions that it intends to handle and the anticipated set of questions that users might ask within the scope of the business application. In an illustrative embodiment, the conversation engine uses Deep Learning classifiers to identify intents 351.

Entities 352 represent real-world objects relevant to the context of a user query. The conversational system chooses specific actions based on identification of entities 352. These need to be provided as a set of predefined entities with examples and domain-specific synonyms (the domain vocabulary) relevant within the context of the conversational application.

Dialog 353 uses discovered intents 351, entities 352, and context 354 from the application to provide an interactive conversational experience to the user. Dialog 353 uses context across conversational turns or user utterances. It is unlikely the user will provide all required information in one pass. Instead, the conversational system must organize a conversation flow that will ask the user questions that are useful in order to gather all the necessary input to provide a helpful answer. Dialog 353 is a branching conversation flow that defines how the application responds when it recognizes the defined intents 351 and entities 352. Dialog 353 is composed of many branching dialog nodes.

Context 354 is a mechanism for passing information between the dialog 353 and the application. Context 354 allows the conversational system to store information to continue passing back and forth across different dialog nodes. For example, if the system identifies names of users in the conversation flow, the conversational system stores that information in context 354 and retrieve it any time the system calls the user by name.

Application 320 also interacts with back-end systems 360 based on the objective of the user's query and additional information. Examples of user objective include the following: search for information in public or private databases, open tickets, show diagrams and maps, or write the user input into systems of record. Back-end systems 360 provide communication with external data sources. In accordance with the illustrative embodiments, the external data sources may include databases, knowledge graphs, or recommendation services, etc.

Contextual help recommendation engine 370 provides a consistent and intuitive way to surface contextually relevant tools to the user in a conversational interface. Contextual help recommendation engine 370 detects scenarios in which the user is frustrated or needs additional assistance and surfaces the relevant help tools directly to the user in the conversation zone of the user interface 310.

Figure 4A:
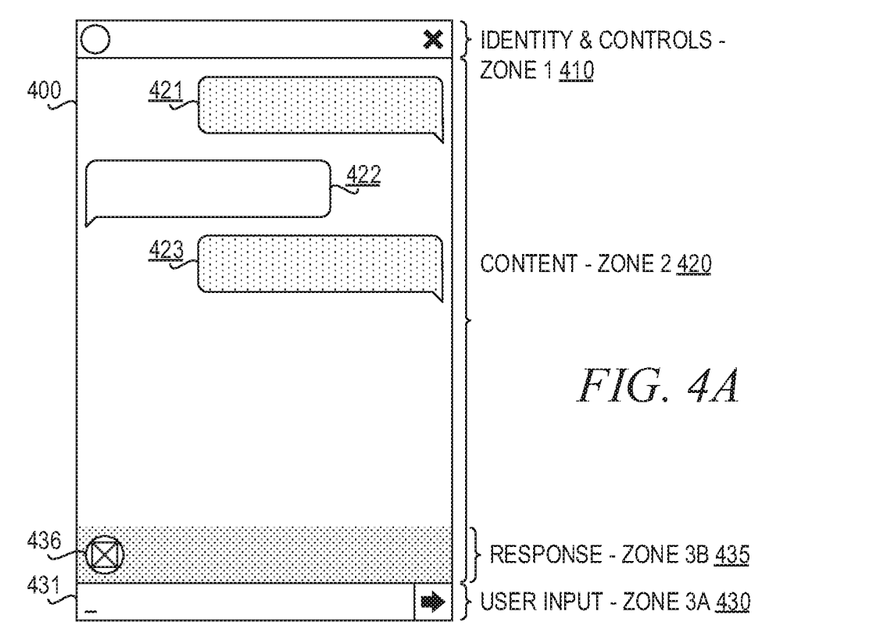
FIGS. 4A-4C illustrate an example of a user interface for surfacing contextual help recommendations in accordance with an illustrative embodiment.
Figure 4B:
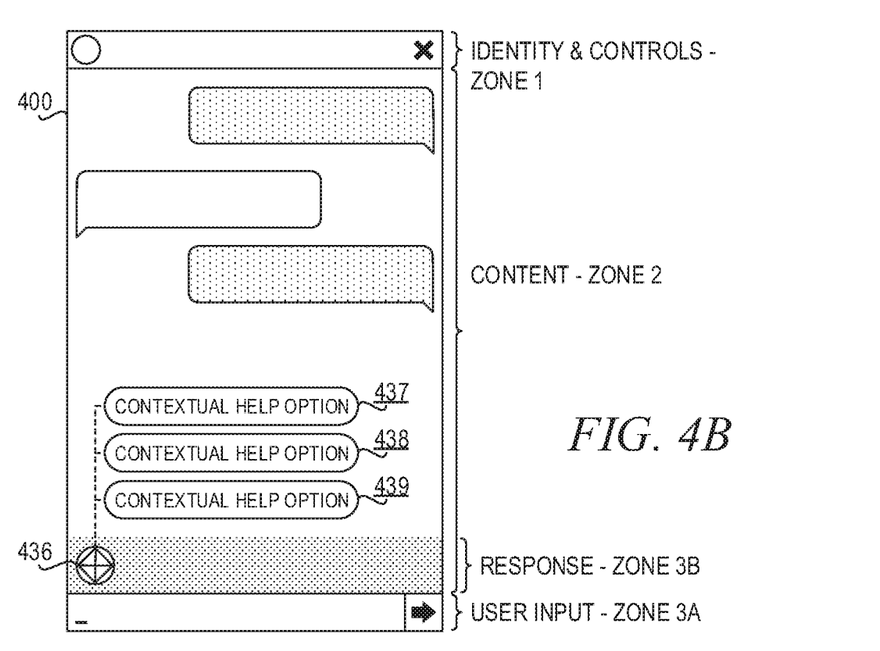
Figure 4C:
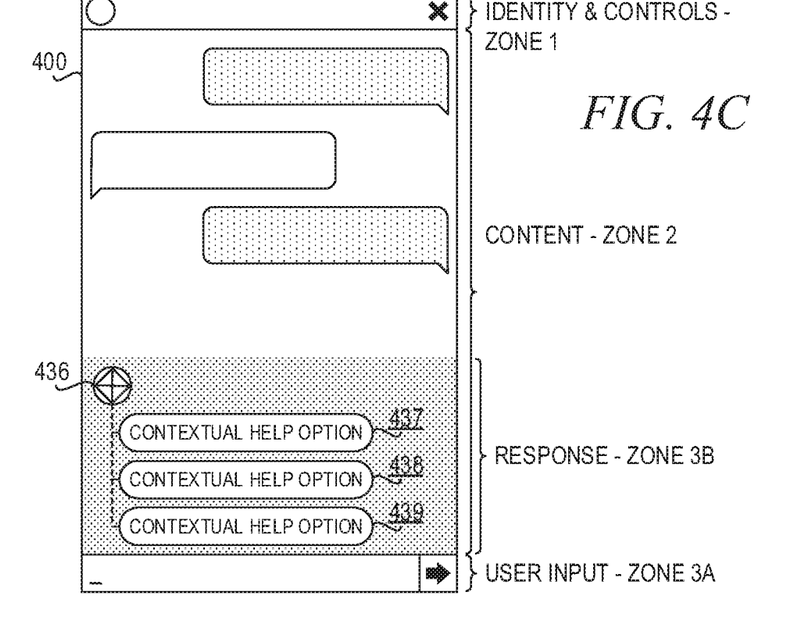

FIGS. 4A-4C illustrate an example of a user interface for surfacing contextual help recommendations in accordance with an illustrative embodiment. With reference to FIG. 4A, chatbot user interface 400 includes an identify and controls zone 1 410, content zone 2 420, user input zone 3A 430, and response zone 3B 435. The user asks the chatbot application a question by entering the question in user input zone 430. The chatbot application comprehends the query by leveraging natural language understanding (NLU) and by determining a confidence level of its understanding. In one embodiment, the confidence level is a confidence score that represents a probability of detecting an entity and intent of the user's question. In another embodiment, the confidence level is a confidence score that represents a probability of determining a next dialog node in the branching conversation flow.

Contextual support is automatically triggered when the chatbot application does not understand the user query, e.g., when the chatbot application is not trained on the query or when the chatbot application is confused between two possible intents. More specifically, the chatbot application may detect when a confidence score for an entity or intent is below a predetermined threshold. Alternatively, the chatbot application may detect when the user query does not lead to a dialog node with a confidence score above a predetermined threshold.

The contextual help recommendation button 436 is presented in response zone 3B 435 at the bottom of content zone 2 420. The contextual help recommendation engine can push contextual suggestions vertically into zone 2 420 so that the user can easily view the options presented in the context of the conversation with the chatbot application. In one embodiment, when triggered, contextual help recommendation button 436 is activated. For example, the contextual help recommendation button 436 may spin or pulsate to indicate to the user that contextual help recommendations are available. The contextual help recommendation engine may push the contextual recommendations into zone 2 420 in response to the user selecting contextual help recommendation button 436. Alternatively, the contextual help recommendation engine may push the contextual recommendations into zone 2 420 automatically and proactively in response to multiple consecutive user queries resulting in confidence scores below a predetermined threshold.

Turning to FIG. 4B, the contextual help recommendation engine pushes contextual help recommendations 437, 438, 439 into zone 2 420. In accordance with the illustrative embodiment, contextual help recommendations 437, 438, 439 are related to the context of the conversation in content zone 2 420. When the chatbot application is not trained to answer the query, the contextual help recommendation engine may suggest speaking to or contacting a human agent, searching for help articles, or viewing topics on which the chatbot application has been trained. When the chatbot application is not confident that it understands the user query, the contextual help recommendation engine may suggest selecting from a few options in which the chatbot application is confident, selecting from a list of similar intents in which the chatbot application has high confidence, speaking to or contacting a human agent, searching for help articles, or viewing topics on which the chatbot application has been trained.

The user may choose not to leverage any of the recommendations 437, 438, 439 and continue using the chatbot application by entering another query in user input zone 430.

Based on the user choice, the chatbot application may move forward in the dialog and support the query. If not, the user has an option to speak with a human agent and/or access company contact information. The user may trigger the contextual help recommendation engine directly by selecting contextual help recommendation button 436 when the chatbot application is not proactively pushing contextual help recommendations. Turning to FIG. 4C, pushing contextual help recommendation button 436 results in contextual help recommendations 437, 438, 439 being pushed vertically in response zone 3B 435, which expands zone 3B 435 into content zone 2 420.

Contextual help recommendations may include contacting a live agent, performing a search capability outside the chatbot application, providing contact information to have someone contact the end user, signaling to the chatbot application that the answer is not correct, backtracking to a previous step in the conversation (i.e., an undo operation), viewing a selection of possible topics on which the chatbot application has been trained, and viewing additional high confidence responses.

Figure 5A:
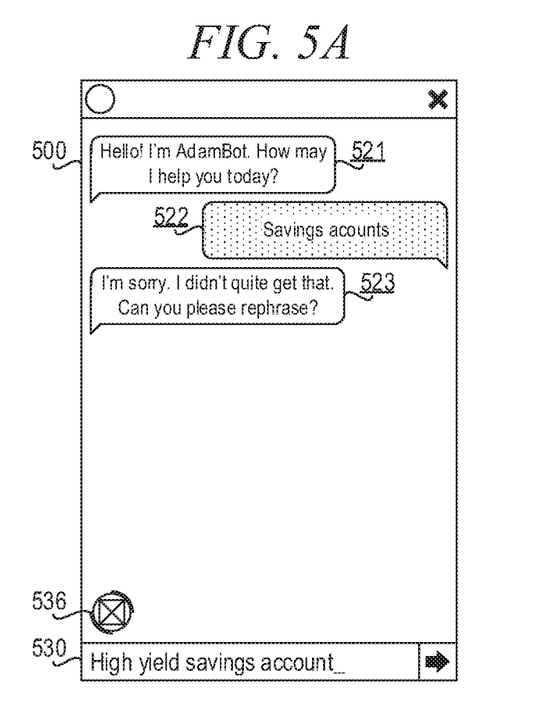
FIGS. 5A-5C depict an example conversation using contextual help recommendations in a chatbot application user interface in accordance with an illustrative embodiment.
Figure 5B:
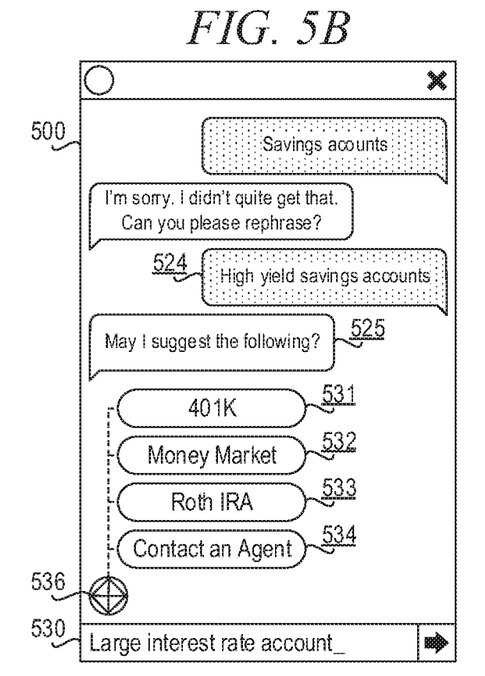
Figure 5C:
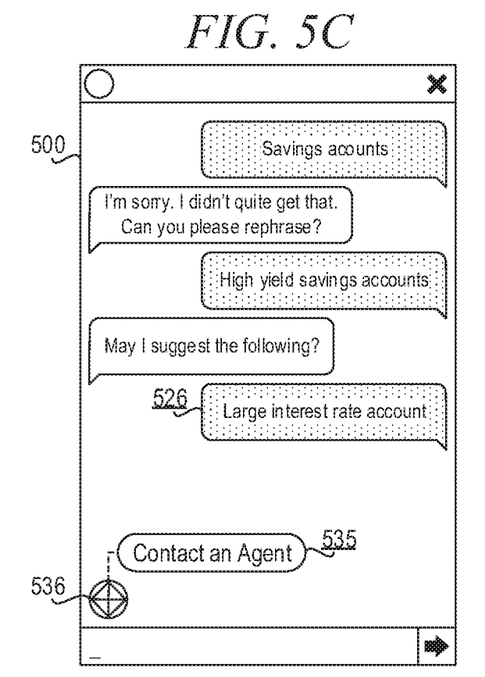

FIGS. 5A-5C depict an example conversation using contextual help recommendations in a chatbot application user interface in accordance with an illustrative embodiment. With reference to FIG. 5A, a user is having a conversation with a chatbot application in chatbot application user interface 500. In message 521, the chatbot application greets the user, and in message 522, the user enters a query, "Savings accounts." In the depicted example, the chatbot application does not understand the user query. For example, the chatbot application may not have a high confidence score for an objective of the user, an entity being referenced by the user's query, or a next dialog node to move the conversation along. Alternatively, the chatbot application may have a high confidence but may require disambiguation between multiple options with close confidence. Thus, the contextual help recommendation button 536 activates. For example, the contextual help recommendation button 536 may spin or pulsate. Message 523 informs the user that the chatbot application does not understand the user's query. In the depicted example, the user does not select the contextual help recommendation button 536; rather, the user enters a new query into user input zone 530.

Turning to FIG. 5B, the user's query, "High yield savings account," is shown in message 524. In the depicted example, the chatbot application again does not understand the user's query. The contextual help recommendation engine proactively triggers, presents message 525 to inform the user of the contextual help recommendations, and presents contextual help recommendations 531-534. In the example shown in FIG. 5B, the contextual help recommendations 531-534 include "401K," "Money Market," "Roth IRA," and "Contact an Agent." In the depicted example, the user does not select one of the contextual help recommendations 531-534; rather, the user enters a new query into user input zone 530.

Turning to FIG. 5C, the user again enters a query, "Large interest rate account," which is shown as message 526. Again, the chatbot application does not understand the user's query. The contextual help recommendation engine proactively triggers and presents contextual help recommendation 535. In the example shown in FIG. 5C, the contextual help recommendation 535 is, "Contact an Agent." At this point, the user may select contextual help recommendation 535 to contact a live agent. In one embodiment, the user may then communicate with a live human agent through the same user interface 500.

Figure 6:
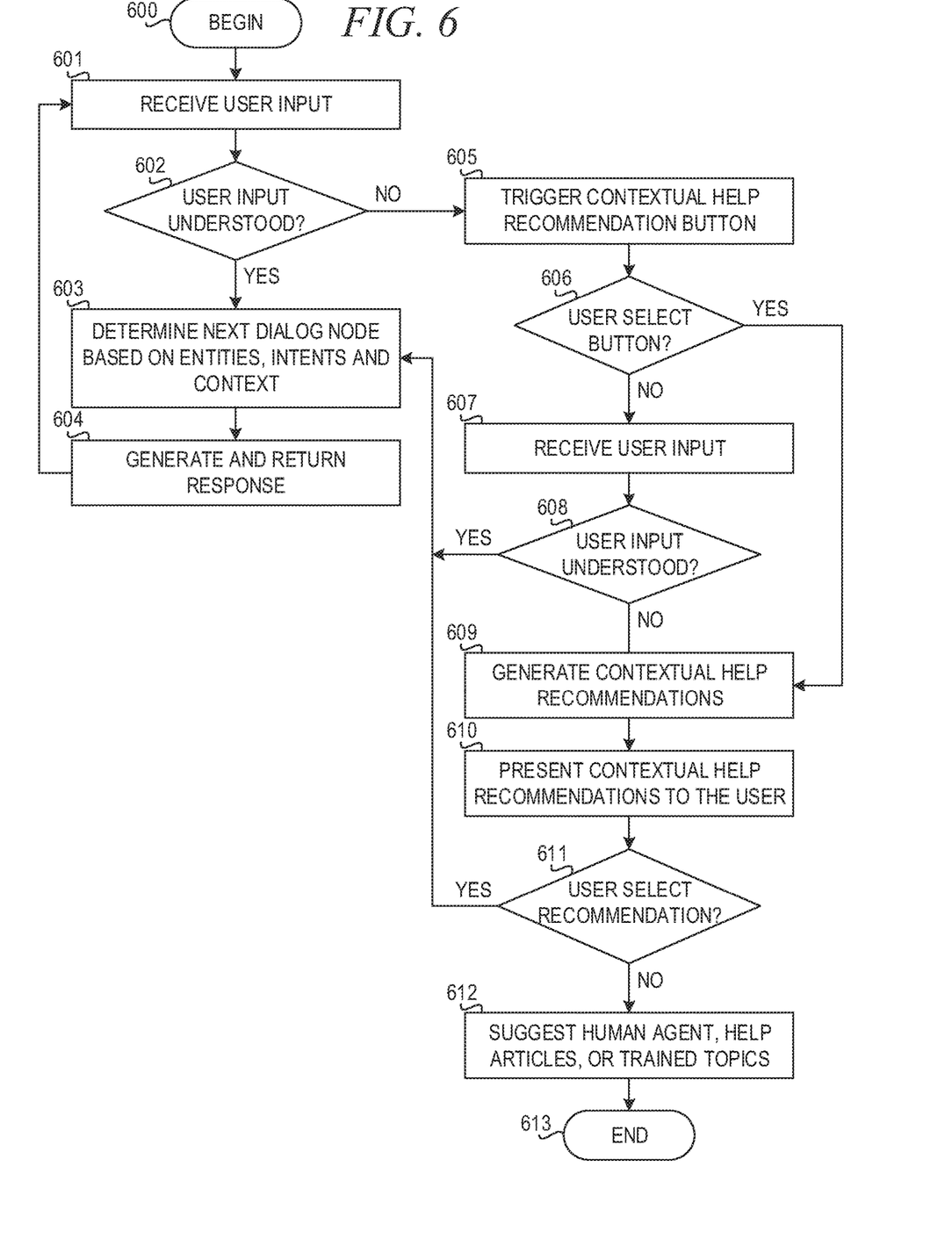
FIG. 6 is a flowchart illustrating the operation of a chatbot application with contextual help recommendations in accordance with an illustrative embodiment.

FIG. 6 is a flowchart illustrating the operation of a chatbot application with contextual help recommendations in accordance with an illustrative embodiment. Operation begins (block 600), and the chatbot application receives a user input (block 601). The chatbot application determines whether the user input is understood (block 602). If the chatbot application understands the user input, then the chatbot application determines a next dialog node based on the entities, intents, and context in the user query and the conversation (block 603). The chatbot application generates and returns a response to the user's query (block 604). Then, operation returns to block 601 to receive the next user input.

If the chatbot application does not understand the user's input in block 602, the chatbot application triggers the contextual help recommendation button (block 605). The chatbot application determines whether the user selects the contextual help recommendation button (block 606). If the user does not select the contextual help recommendation button, then the chatbot application receives the next user input (block 607). The chatbot application determines whether the user input is understood (block 608). If the chatbot application understands the user input, then the chatbot application determines a next dialog node based on the entities, intents, and context in the user query and the conversation (block 603). The chatbot application generates and returns a response to the user's query (block 604). Then, operation returns to block 601 to receive the next user input.

If the user selects the contextual help recommendation button in block 706 or the user input is not understood in block 608, then the chatbot application generates contextual help recommendations (block 609). A possible list of contextual help recommendations is obtained during the chatbot's intent classification process where a list of intents with various confidence scores is returned. The list is reduced by removing options: a) that are similar to the intent classified with the highest confidence based on closeness of confidence scores, b) duplicate intents determined by the potential intent dialog responses, and c) removing intents that do not have a human readable identifier such as a dialog node title. The resulting recommendation list may be sorted in a random order to prevent bias in choosing the first option.

The chatbot application presents the contextual help recommendations to the user (block 610). The chatbot application then determines whether the user selects a contextual help recommendation (block 611). If the user selects a recommendation, then the chatbot application determines a next dialog node based on the entities, intents, and context in the user query and the conversation (block 603). The chatbot application generates and returns a response to the user's query (block 604). Then, operation returns to block 601 to receive the next user input.

If the user does not select one of the presented contextual help recommendations in block 611, then the chatbot application suggests contacting a human agent, searching for help articles, or viewing topics on which the chat application is trained (block 612). Thereafter, operation ends (block 613).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a chatbot application for providing contextual help recommendations based on conversational context and interaction patterns, the method comprising:

receiving, by the chatbot application, a query from a user in a user input zone of a user interface of the chatbot application, wherein the user interface comprises the user input zone and a content zone, wherein the chatbot application sends the query to a conversation service comprising intents, entities, dialog, and context, wherein intents represent a purpose or goal, wherein entities represent real-world objects relevant to the context, wherein the dialog comprises a conversation flow of branching dialog nodes, and wherein the context comprises stored information specific to the conversation flow;

applying natural language processing (NIT) to the query to determine an objective of the query and a confidence score representing a confidence that the query leads to a dialog node in the conversation flow;

responsive to determining the confidence score is below a predetermined threshold, automatically generating a first set of recommendations to the user based on the conversation context;

activating a contextual help recommendation button in a response zone of the user interface to indicate to the user that the first set of recommendations are available to be viewed; and responsive to the user selecting the contextual help recommendation button, presenting the first set of recommendations to the user in the content zone of the user interface.

2. The method of claim 1, wherein the presented first set of recommendations further comprise contacting a human agent, searching help articles, and viewing topics.

3. The method of claim 1, further comprising:
responsive to the user selecting one of the first set of recommendations, submitting the selected recommendation to the conversation service.

4. The method of claim 1, further comprising:
receiving a second query from the user;
applying natural language processing (NLP) to the second query to determine an objective of the second query and a confidence score associated with the second query;
responsive to determining the confidence score associated with the second query is below a predetermined threshold, automatically presenting a second set of recommendations to the user.

5. The method of claim 4, wherein the second set of recommendations include selecting from a set of helps, a set of intents, and a set of topics based on the conversation context.

6. The method of claim 4, wherein the second set of recommendations include one or more of contacting a human agent, performing a search, providing contact information to have a human agent contact the user, signaling that a response from the chatbot application is not correct, backtracking to a previous step in the conversation, viewing a selection of topics on which the chatbot application has been trained, and viewing responses having an objective with a confidence above the predetermined threshold.

7. The method of claim 4, further comprising:
receiving a third query from the user;
applying natural language processing (NLP) to the third query to determine an objective of the third query and a confidence of score associated with the third query;
responsive to determining the confidence of score associated with the third query is below a predetermined threshold, automatically presenting a recommendation to contact a live human agent to the user.

8. The method of claim 1, wherein applying NLP to the query comprises determining an intent and one or more entities for the query and wherein the first set of recommendations is based on similar intents having high confidence scores.

9. A computer program product comprising a computer readable storage medium having a computer readable program stored therein, wherein the computer readable program, when executed on a computing device, causes the computing device to implement a chatbot application for providing contextual help recommendations based on conversational context and interaction patterns, wherein the computer readable program causes the computing device to:

receive, by the chatbot application, a query from a user in a user input zone of a user interface of the chatbot application, wherein the user interface comprises the user input zone and a content zone, Wherein the chatbot application sends the query to a conversation service comprising intents, entities, dialog, and context, wherein intents represent a purpose or goal, wherein entities represent real-world objects relevant to the context, wherein the dialog comprises a conversation flow of branching dialog nodes, and wherein the context comprises stored information specific to the conversation flow;

apply natural language processing (NLP) to the query to determine an objective of the query and a confidence score representing a confidence that the query leads to a dialog node in the conversation flow;

responsive to determining the confidence score is below a predetermined threshold, automatically generate a first set of recommendations to the user based on the conversation context;

activate a contextual help recommendation button in a response zone of the user interface to indicate to the user that the first set of recommendations are available to be viewed; and responsive to the user selecting the contextual help recommendation button, present the first set of recommendations to the user in the content zone of the user interface.

10. The computer program product of claim 9, wherein the presented first set of recommendations further comprise contacting a human agent, searching help articles, and viewing topics.

11. The computer program product of claim 9, wherein the computer readable program further causes the computing device to:
responsive to the user selecting one of the first set of recommendations, submit the selected recommendation to the conversation service.

12. The computer program product of claim 9, wherein the computer readable program further causes the computing device to:
receive a second query from the user;
apply natural language processing (NLP) to the second query to determine an objective of the second query and a confidence of score associated with the second query;

responsive to determining the confidence of score associated with the second query is below a predetermined threshold, automatically present a second set of recommendations to the user.

13. The computer program product of claim 12, wherein the second set of recommendations include selecting from a set of helps, a set of intents, and a set of topics based on the conversation context.

14. The computer program product of claim 12, wherein the second set of recommendations include one or more of contacting a human agent, performing a search, providing contact information to have a human agent contact the user, signaling that a response from the chatbot application is not correct, backtracking to a previous step in the conversation, viewing a selection of topics on which the chatbot application has been trained, and viewing responses having an objective with a confidence above the predetermined threshold.

15. The computer program product of claim 12, wherein the computer readable program further causes the computing device to:
receive a third query from the user;
apply natural language processing (NLP) to the third query to determine an objective of the third query and a confidence of score associated with the third query;
responsive to determining the confidence of score associated with the third query is below a predetermined threshold, automatically present a recommendation to contact a live human agent to the user.

16. The computer program product of claim 9, wherein applying NLP to the query comprises determining an intent and one or more entities for the query and wherein the first set of recommendations is based on similar intents having high confidence scores.

17. An apparatus comprising:
a processor; and
a memory coupled to the processor, wherein the memory comprises instructions which, when executed by the processor, cause the processor to implement a chatbot application for providing contextual help recommendations based on conversational context and interaction patterns, wherein the instructions cause the processor to:
receive, by the chatbot application, a query from a user in a user input zone of a user interface of the chatbot application, wherein the user interface comprises the user input zone and a content zone, wherein the chatbot application sends the query to a conversation service comprising intents, entities, dialog, and context, wherein intents represent a purpose or goal, wherein entities represent real-world objects relevant to the context, wherein the dialog comprises a conversation flow of branching dialog nodes, and wherein the context comprises stored information specific to the conversation flow;
apply natural language processing (NLP) to the query to determine an objective of the query and a confidence score representing a confidence that the query leads to a dialog node in the conversation flow;
responsive to determining the confidence score is below a predetermined threshold, automatically generate a first set of recommendations to the user based on the conversation context;
activate a contextual help recommendation button in a response zone of the user interface to indicate to the user that the first set of recommendations are available to be viewed; and
responsive to the user selecting the contextual help recommendation button, present the first set of recommendations to the user in the content zone of the user interface.

18. The apparatus of claim 17, wherein the instructions further cause the processor to:
receive a second query from the user;
apply natural language processing (NLP) to the second query to determine an objective of the second query and a confidence score associated with the second query;
responsive to determining the confidence of score associated with the second query is below a predetermined threshold, automatically present a second set of recommendations to the user.

19. The apparatus of claim 17, wherein applying NLP to the query comprises determining an intent and one or more entities for the query and wherein the first set of recommendations is based on similar intents having high confidence scores.

20. The apparatus of claim 17, wherein the instructions further cause the processor to:
receive a third query from the user;
apply natural language processing (NLP) to the third query to determine an objective of the third query and a confidence score associated with the third query;
responsive to determining the confidence score associated with the third query is below a predetermined threshold, automatically present a recommendation to contact a live human agent to the user.

* * * * *